Jan. 5, 1932.  E. E. KITTREDGE ET AL  1,839,764
ELECTRIC STEAM GENERATING SYSTEM
Filed June 14, 1930  2 Sheets-Sheet 1

INVENTORS.
Ernest E. Kittredge
Joseph A. Foster
Rasmus P. Johansen
BY Harry C. Schroeder
ATTORNEY

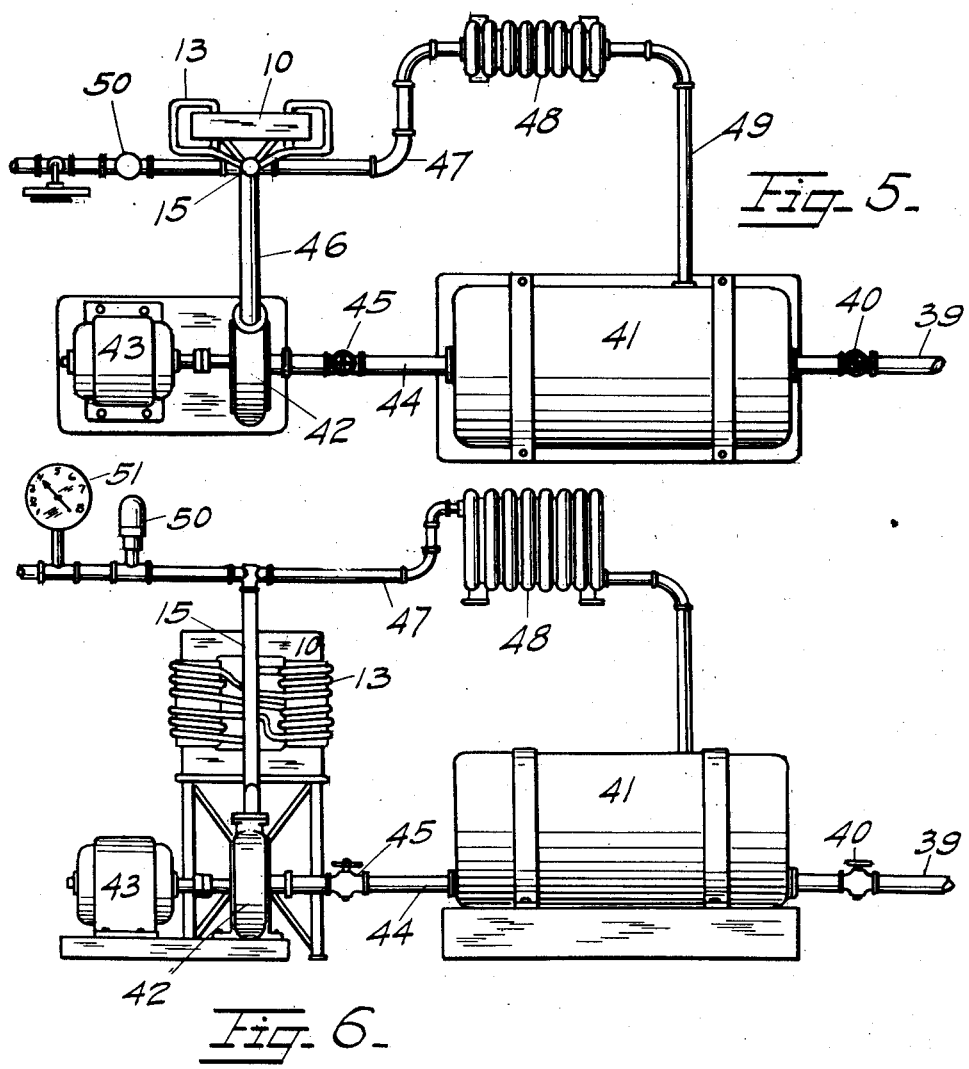

Patented Jan. 5, 1932

1,839,764

UNITED STATES PATENT OFFICE

ERNEST E. KITTREDGE, OF ALAMEDA, JOSEPH A. FORSTER, OF OAKLAND, AND RASMUS D. JOHANSEN, OF ALAMEDA, CALIFORNIA

ELECTRIC STEAM GENERATING SYSTEM

Application filed June 14, 1930. Serial No. 461,148.

The invention is for an electric steam generating system and has special reference to the rapid generation of steam to be used for heating and power purposes.

The usual types of steam generating equipment are usually cumbrous affairs which are not readily or conveniently moved or installed.

The object of the invention is to provide a steam generator which is electrically heated, which is practically instantaneous in the production of steam, very compact referred to the amount of steam generated, and which may be built in sizes to suit the actual steam requirements, and to suit the line voltage available.

Another object of the invention is to provide a steam generator which may be made in sizes for permanent installation as also in sizes which can be plugged into the ordinary receptacle.

A further object of the invention is to provide a transformer type of steam generator as previously outlined, water being passed through hollow secondary windings of the transformer and being converted into steam therein, and controlling means for the primary circuit whereby heating of the water in the secondary may be regulated, and in addition having means for controlling the flow of water through the secondary winding, and thermostatic control means for interrupting the line circuit in the event of failure of the water supply.

Other objects of the invention will become apparent as the description is set forth when referred to the accompanying drawings in which:

Fig. 5 is a plan view of a steam generating plant utilizing my system;

Fig. 6 is an elevation of the steam generating plant indicated in plan in Fig. 5.

Figure 1:
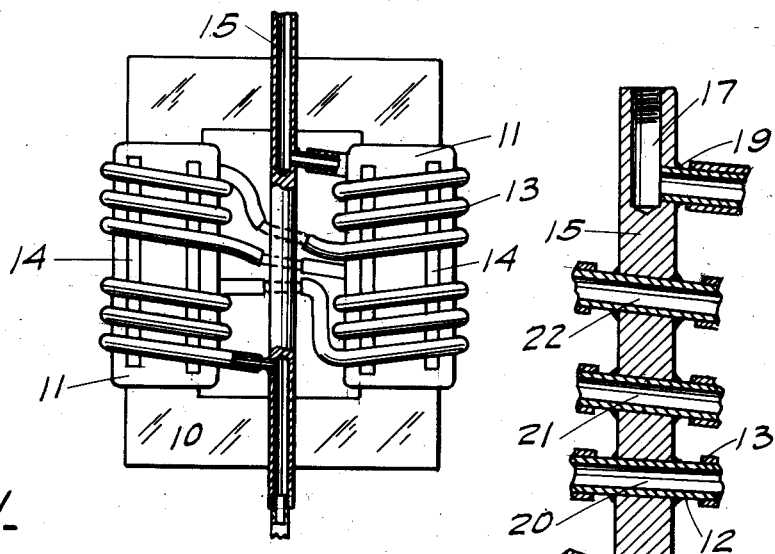
Fig. 1 is an elevation of the steam generator.
Figure 2:
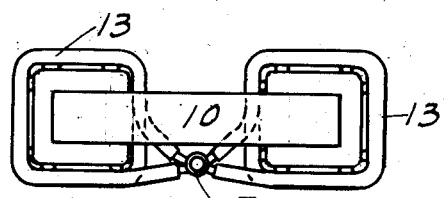
Fig. 2 is a top plan view of the steam generator.

The invention consists primarily of a transformer, the primary of which is connected in circuit with a power supply, the secondary comprising a plurality of windings short circuited by a single bus, the windings being composed of a single continuous length of tubing, the ends of which are connected to the opposite recessed ends of the bus and communicable therewith, means for forcing water through the tube, thermostatic control means operable by the radiated heat of the secondary and controlling the primary circuit. A safety valve is provided in the steam line as also a pressure regulator adapted to control the main circuit in the customary manner. A water storage tank is provided for storage of the condensed steam which is returned through the steam generator where the steam is to be used for heating. A rheostat in the circuit to primary provides for control of the steam supply.

Similar reference characters are used to indicate similar parts throughout the several views.

The transformer may be made in any standard type, but is best suited to the shell or core type. As indicated in Fig. 1, the steam generator consists of a laminated iron core 10 provided with primary windings 11 of the usual insulated copper wire and connected in series to a source of alternating current.

The secondary winding consists of a continuous length of metallic tubing 12 covered with heat insulating material 13 and wound over the primary windings and interposed heat insulating spacers 14. A bus 15 consists of a bar of conducting material such as copper or brass, provided with apertures 16 and 17 at the lower and upper ends respectively, the apertures being threaded to cooperate with the threaded ends of water and steam connections. Transverse apertures are provided at 18 and 19 to receive the opposite ends of the continuous length of metallic tubing. A plurality of transverse apertures 20, 21 and 22 through the solid section of the bus and disposed between the end apertures are provided for passage therethrough of the tubing. The tube is first inserted in aperture 18 and brazed or welded in place to provide a steam and water tight joint. Heat insulating material 13 is then applied to a section of the tube sufficient in length to make a few turns about the primary and reach to the aperture 20, through which the uncovered tube is passed continuing about the other coil after covering with insulation, thence through aperture 21, applying insulation, continuing about the first coil, through aperture 22, about the second coil, terminating in the aperture 19, the tube being brazed or hard soldered at all points along the bus 15 to provide all joints of low resistance. The successive lengths of the tube incorporated in the various windings should be of approximately equal resistance so as to provide an even distribution of current through the respective windings. It will be noted that this arrangement provides a plurality of short circuited secondaries, with a continuous passage through the tube from aperture 16 to aperture 17.

The construction of the secondary is such as to provide low voltage high amperage secondaries and as the secondaries are short circuited the current passing through said circuit is necessarily converted into heat. The water passing through the tube is practically a nonconductor of electric current, therefore the walls of the tube are required to carry the current which must also be dissipated therein and as heat insulating material is applied to the outside of the tube, the heat generated in the tube walls is conducted to the water passing through the tube. As the voltage would necessarily be low in the secondaries, it is necessary to keep the resistance low, yet the resistance should be as high as possible to permit maximum amperage required at the delivered voltage, through the various coils. Control of the amperage and consequently of the heat transmitted to the water is obtained by means of a rheostat in the primary circuit.

Figure 3:
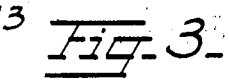
Fig. 3 is a sectional elevation of the short circuiting bus, with water intake and steam outlet.
Figure 4:
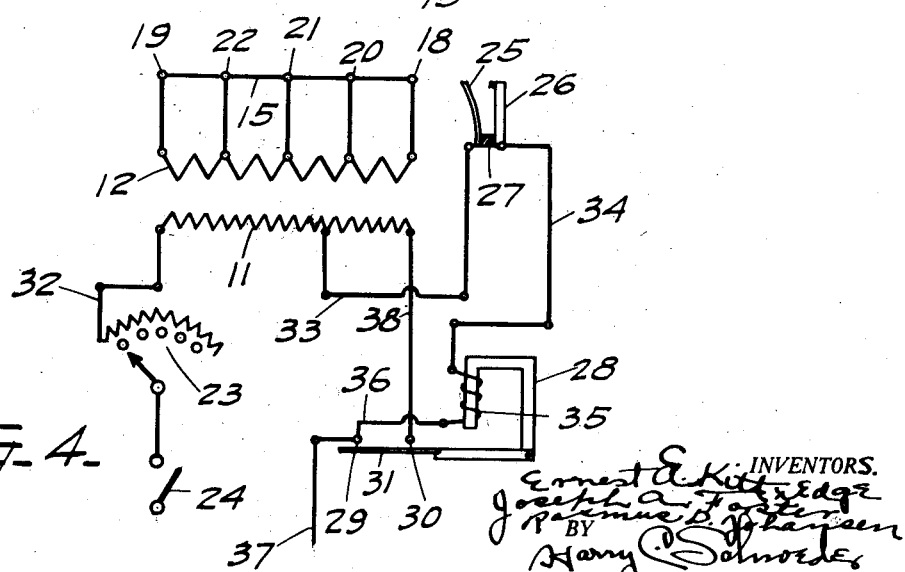
Fig. 4 is a wiring diagram of the steam generator.

Referring to the wiring diagram, the numeral 15 indicates the bus shown in Fig. 3, while 18 and 19 indicate the connections of the tube in the similarly numbered apertures, and which they indicate. The respective secondaries are indicated at 12, showing a system of four secondary coils all short circuited to the bus 15. The primary 11 is indicated as an auto transformer type to provide a low voltage tap for a thermostatic control which may be conveniently attached to or adjacent to the bus 15 or tube 12. A rheostat 23 provides for regulation of current and consequently the heating of the coils and contained water, and a switch 24 permits disconnection of the primary circuit.

The thermostatic control may be of any conventional type and is shown as a laminated metal type, the laminations of which have different coefficients of expansion. The lever 25 is normally in contact with a resilient arm 26, insulated one from the other by an insulating block 27, and connected in circuit with an auxiliary relay 28 and which normally bridges the contacts 29 and 30 by the lever 31.

The operation of the electrical circuit is as follows: Water is forced through the aperture 16 thence through the tube 12 and out through aperture 17. Switch 24 is closed, which closes the relay 28 and coincidently bridges contacts 29 and 30 by arm 31, the circuit through the relay being through rheostat 23, wire 32, primary 11, wire 33, thermostatic lever 25, resilient arm 26, wire 34, coil 35, wire 36 to line circuit 37, and the primary circuit being completed through switch 24, rheostat 23, wire 32, primary 11, wire 38, contact 30, arm 31, contact 29 to line 37 or power supply.

Should the water be heating more than is required, more resistance is cut in at the rheostat 23 thereby reducing the available amperage in the secondary.

In case of failure of water supply through the secondary, or excessive heating of the tube, the differential metals in the closed circuit thermostat lever 25, causes this lever to warp, the resilient arm 26 retaining contact therewith until a definite temperature is reached, the contact then breaking and coincidently breaking the circuit through the relay and opening the contacts 29 and 30, cooling of the tube again permitting the contacts 25 and 26 to close and coincidently closing the contacts 29 and 30 by means of the relay 28.

The application of the system indicated in Figs. 5 and 6 refers to the utilization of the steam for heating purposes.

A water supply pipe 39 is provided with a shut off valve 40 and leading into a supply tank 41. A centrifugal pump 42 driven by an electric motor 43, draws water from the tank 41 through pipe 44 which is provided with a regulating valve 45, and forces the water through a pipe 46 to the bus 15, whence it passes through tube 12, being converted into steam and passing through the pipe 47 to a radiator 48, gives up its heat and is condensed, flowing back to the tank 41 through pipe 49. A safety valve 50 and pressure indicator 51 are provided for auxiliary safety control.

The system of piping and control may be varied to suit the particular requirements.

Having described an operative method of constructing, installing and operating the device, it will be understood that variations in design, construction and arrangement of parts which are consistent with the appended claims may be resorted to without detracting from the spirit or scope of the invention or sacrificing any of its advantages.

What we claim is:—

1. An electric steam generator, comprising a transformer core, primary windings on said core and connected in circuit with an adjustable rheostat and a power supply, a plurality of secondary windings consisting of heat insulated conductive tubing electrically terminating in a common bus and providing a continuous passage therethrough for flow of water, said passage terminating and communicating with recesses at both ends of said bus, said recesses being adapted for connection of pipes or tubes thereto.

2. An electric steam generator comprising a transformer core, primary windings on said core and connected in circuit with an adjustable resistance and a power supply, a plurality of secondary windings consisting of heat insulated tubing wound about said primary windings and electrically terminating in and short circuited by a common bus, said plurality of secondary windings providing a continuous passageway for liquids therethrough and terminating in and communicating with recesses at opposite ends of said bus, said recesses being adapted for connection of pipes or tubes thereto, and a thermostatic control for said primary circuit adapted to interrupt said circuit in the event of overheating of said secondaries.

3. An electric steam generator comprising a transformer core, primary windings on said core and connected in circuit with a variable resistance and a power supply, a plurality of secondary windings in inductive relation to said primary windings, said secondary windings consisting of a continuous length of conductive tubing electrically connected and communicating with recesses formed at opposite ends of a bus, said tubing being intermediately electrically connected to said bus at the coincidences of each two adjoining windings, said tubing having a covering of heat insulation between said connections, said recesses being adapted for connection of pipes or tubing thereto, a thermo-relay control for said primary circuit adapted to be interrupted by excessive heating of said secondary.

4. An electric steam generator comprising a magnetic core, primary windings on said core connected in circuit with an adjustable resistance and a power supply, a plurality of secondary windings in inductive relation to said primary windings, said secondary windings consisting of a continuous length formed into a plurality of coils of heat insulated conductive tubing of substantially equal electrical resistance electrically connected to a common bus, and forming a continuous passageway for water and steam therethrough, the opposite ends of said tubing communicating with recesses at opposite ends of said bus and electrically connected thereto, a thermo-electric relay adapted to interrupt said primary circuit by excessive heating of the secondaries, and means for connecting said bus to a water supply.

5. An electric steam generator comprising a magnetic core, primary windings on said core connected in circuit with a current control device and a power supply, a plurality of secondary windings in inductive relation to said primaries and consisting of a continuous length of conductive tubing formed into a plurality of coils of substantially equal electrical resistance short circuited to a common bus, the first and last ends of said tubing communicating with recesses at the opposite ends of said bus, said coils having a covering of heat insulation, a thermo-electric relay adapted to interrupt the primary circuit by excessive heating of the secondary, a water supply under pressure connected to one of said recesses, a steam delivery line connected with the other recess, the condensed steam being returned for recirculation through said tube.

6. An electric steam generator comprising a laminated core, primary windings on said core connected in circuit with a power supply, current control means for said circuit, secondary windings of conductive tubing in inductive relation to said primary windings, said secondary windings being connected in series, and individually short circuited by a common bus providing a plurality of closed circuit secondaries of substantially equal electrical resistance, the first end of the first coil and last end of the last coil communicating with threaded recesses at opposite ends of said bus, a thermostatically operated relay adapted to retain said primary circuit in normally closed position and to interrupt said circuit in the event of overheating of said secondary, a water supply under pressure circulated through said secondaries and connected to said bus, means for regulating delivery of water thereto, a steam delivery connection at the opposite end of said bus, a safety valve on said steam delivery, a pressure regulator in the steam line adapted to control the primary electrical circuit and a storage tank for said water supply and adapted to receive the products of condensation of said steam.

In testimony whereof we affix our signatures.

ERNEST E. KITTREDGE.
JOSEPH A. FORSTER.
RASMUS D. JOHANSEN.